United States Patent [19]

Reed

[11] 4,150,183

[45] Apr. 17, 1979

[54] LABEL MATRIX STRIPPING

[75] Inventor: Charles F. Reed, Painesville, Ohio

[73] Assignee: Avery International Corporation, Painesville, Ohio

[21] Appl. No.: 850,236

[22] Filed: Nov. 10, 1977

[51] Int. Cl.[2] .......................... B32B 3/16; B32B 7/06

[52] U.S. Cl. ....................................... 428/42; 40/2 R; 206/820; 283/21

[58] Field of Search ..................... 40/2 R; 283/18, 21; 428/40–43; 206/460, 820

[56] References Cited

U.S. PATENT DOCUMENTS

| | | | |
|---|---|---|---|
| 3,006,793 | 10/1961 | Wheeler | 428/41 |
| 3,035,957 | 5/1962 | Morgan | 428/41 |
| 3,386,846 | 6/1968 | Lones | 428/42 |
| 3,522,136 | 7/1970 | Williams et al. | 156/384 X |
| 3,524,782 | 8/1970 | Buske | 428/41 X |
| 3,706,626 | 12/1972 | Smith et al. | 428/42 |
| 3,769,147 | 10/1973 | Komendat et al. | 428/41 X |
| 3,900,645 | 8/1975 | Morgan | 428/41 |

*Primary Examiner*—Henry F. Epstein

*Attorney, Agent, or Firm*—McNenny, Pearne, Gordon, Gail, Dickinson & Schiller

[57] ABSTRACT

A series of labels remain supported on a liner after a matrix of waste label material has been stripped from the liner. The adhesion of the matrix to the liner is weakened prior to stripping of the matrix by mechanically disturbing without severing, as by embossing, areas of the construction where the matrix overlies the liner. Areas where the leading ends of labels overlie the liner may also be similarly disturbed to make eventual peeling of the liner from the labels easier. In another aspect, the construction may be precrushed with a blunt die prior to die-cutting of the labels to eliminate "halo" effect upon stripping of the matrix.

7 Claims, 13 Drawing Figures

LABEL MATRIX STRIPPING

It has long been a practice in the label industry to provide rolls of labels in the form of a web of liner material and a succession of labels temporarily adhered thereto on a face thereof, such construction being wound on itself to provide a roll of labels which may be conveniently dispensed. The construction is formed by die-cutting the labels in a layer of label stock, and then stripping or separating the matrix of waste or excess label material, leaving the die-cut labels adhered to the liner. However, stripping requires positive and certain separation of the matrix from the rest of the construction when the former and latter are guided in divergent paths, and in many applications this cannot be achieved, particularly as line speeds are increased or lighter or more fragile or more flexible material is sought to be utilized, as for example for purposes of cost reduction or for improved labeling performance.

In an effort to improve matrix separation, it has been known to provide for extra cuts in the matrix between the pairs of cuts forming the trailing and leading edges of successively formed labels. However, such extra cuts sever and weaken the matrix so that theoretically easier matrix separation tends to be offset by easier matrix breakage, and satisfactory matrix separation is still not achieved when relatively light, fragile, or flexible materials are used. The practice of providing such extra cuts did not adequately solve the problem of matrix breakage.

The present invention provides positive and certain matrix separation in applications where acceptable separation performance has not previously been attainable. The invention can also greatly improve performance where only marginal performance has previously been obtainable.

Turning now to dispensing, when liner-suported labels are ultimately dispensed, the liner material is typically drawn around or over a peel edge to separate the labels from the liner as the labels advance past the peel edge. However, such separation may require excessive tensioning of the liner, particularly in the case of relatively light, fragile or flexible label materials. The invention greatly reduces necessary tension over the peel edge. The invention achieves peel-edge separation of labels from supporting liners in applications where acceptable performance has not previously been attainable, and the invention can improve performance in this respect where only marginal performance has been previously obtainable.

Still another problem has been the "halo" effect sometimes encountered when the matrix is stripped. This effect reflects the tendency of adhesive which is originally under the edges of successive labels, particularly the leading edges, to remain with the immediately adjacent adhesive under the corresponding cut edges of the matrix as the matrix starts to be lifted from the labels. As lifting continues, the adhesive which was originally under the labels eventually breaks away from the adhesive under the matrix area, but not before the former adhesive is extended around the leading edges of the labels and even slightly over the top faces of the labels at their leading edge. Accordingly, when breakaway occurs, the extended adhesive often does not spring back in its entirety to its original position under the label but, instead, is partly caught on the edges and even the front edge portions of the top face of the labels.

This is unsightly and leads to blocking when the construction is self-wound. In one respect, the invention accomplishes the elimination of such halo effect.

The objects and advantages of the invention will be more fully understood from the following description and the accompanying drawings.

Figure 6:
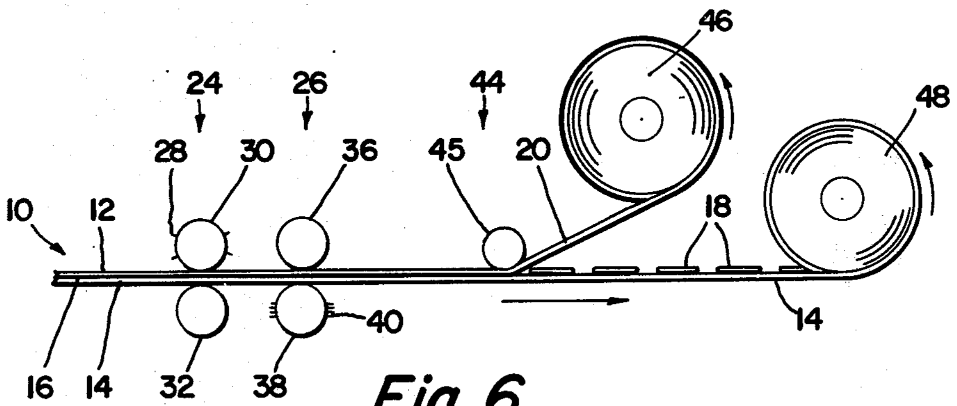
FIG. 6 is a schematic illustration of a die-cutting and matrix stripping operation according to the practice of the invention using the roll set-up illustrated in FIG. 2.

At the left end of FIG. 6 is shown a laminate 10 of the general type widely used in label manufacture. The laminate 10 includes a web of label material 12 and a web of liner material 14. The label material 12 is adhered to the liner material 14 in the illustrated example by a pressure-sensitive adhesive layer 16 and a release coat (not shown) is provided on the liner material 14 to enable the pressure-sensitive adhesive to release from the liner when the label material is pulled away from the liner.

Figure 1:
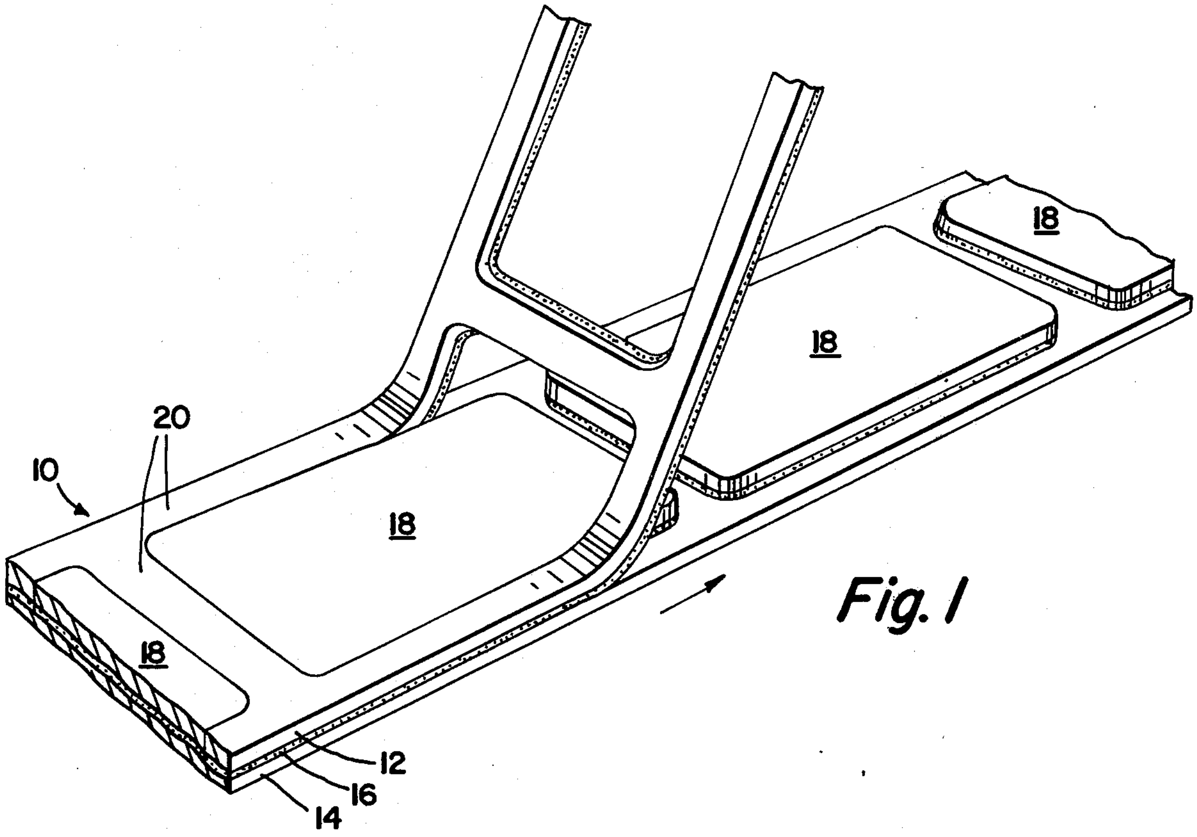
FIG. 1 is a schematic, isometric view illustrating a conventional matrix stripping operation.

FIG. 1 shows the laminate 10 after the label material 12 has been die-cut into a series of labels 18 surrounded by a matrix 20 of excess label material. After the labels 18 are formed, the matrix 20 is stripped from the liner 14, and hence from the laminate 10, to leave the series of labels 18 supported on the liner material 14. Subsequently, the labels are dispensed from the liner 14. The mounting of the labels on the liner enables them to be handled in an efficient manner in production steps, such as decorating and high speed dispensing.

In many applications, particularly when line speeds are increased or lighter or more fragile or more flexible material is sought to be utilized, the matrix 20 will not separate from the labels 18 and the liner material 14 in a positive and certain manner, but rather will tend to "hang up" and thereby wholly or partially destroy or degrade the construction and interfere with manufacturing production. Furthermore, when a liner such as the liner 14 is drawn over a peel edge, such as the peel edge 22 seen in FIG. 7, to separate labels such as the labels 18 from the liner, the separation must be positive and certain, particularly in the case of relatively light, fragile or flexible label materials. Furthermore, a halo effect may be encountered during stripping of the matrix. Referring again to FIG. 1, as the matrix 20 lifts from the edges of each label 18, and particularly from the leading edge, the adhesive under the edge of the label 18 tends to remain with the imnmediately adjacent adhesive under the corresponding cut edge of the matrix as the matrix starts to be lifted. As lifting continues, the adhesive which was originally under the label eventually breaks away from the adhesive under the matrix, but not before the adhesive originally under the label is extended around the leading edge of the label and even slightly over the top face of the label. Accordingly, when breakaway occurs, the extended adhesive may be partly caught on the edges of the label and even on the edge portion of the top face of the label. This is unsightly and causes blocking when the construction is self-wound.

All of the foregoing refers to known constructions and methods and to problems encountered by them.

According to the invention, existing or to-be-formed matrix areas of the laminate are mechanically disturbed preferentially to existing or to-be-formed label areas of the laminate, and such mechanical disturbing is done prior to separation of the matrix from the laminate.

Figure 2:
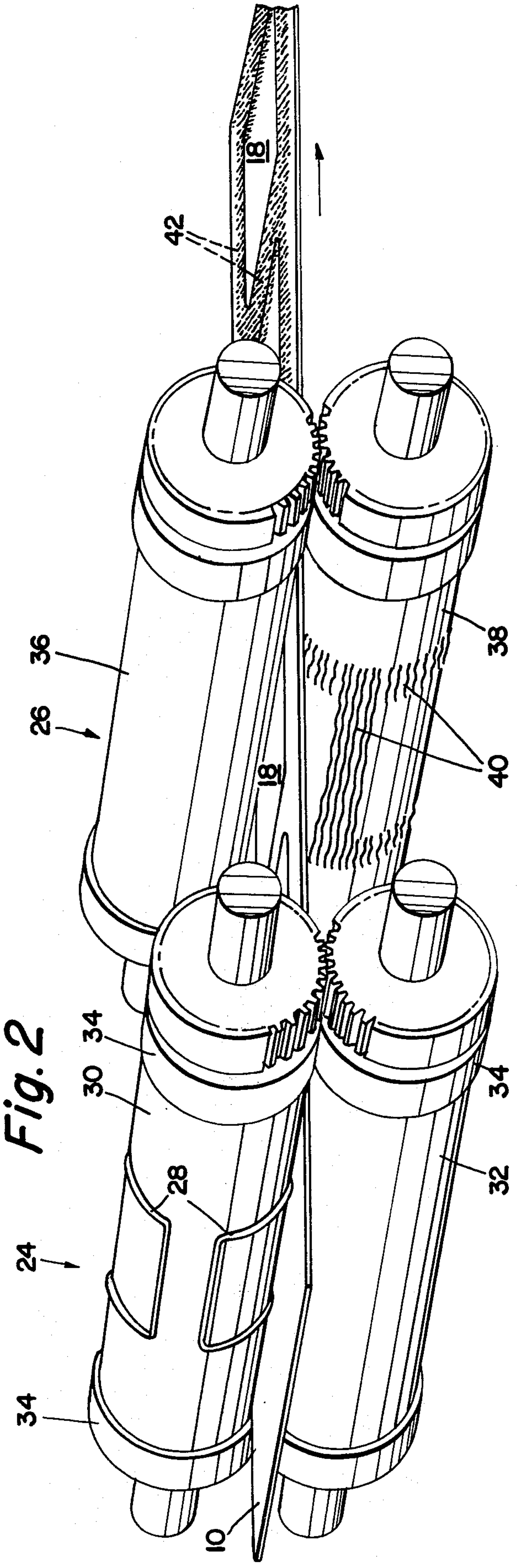
FIG. 2 is a schematic, isometric view of a roll set-up illustrating the invention.

By way of example, FIG. 2 illustrates die-cutting of labels such as the labels 18 in a conventional manner at a station 24, immediately followed by the mechanical disturbing of the matrix areas preferentially to the label areas, which is accomplished at station 26.

At station 24 the labels 18 are die-cut by means of the dies 28 formed on the die roll 30 and which cut the label material of the laminate 10. During cutting, the laminate 10 is supported against the surface of the anvil roll 32, which is accurately spaced from a die roll 30 by the roll spacer or bearer members 34 associated with each roll, or in any other known manner. The dies 28 preferably sever the label material and penetrate the pressure-sensitive adhesive and barely "kiss" or contact the underlying liner material. (However, the adhesive tends to reconnect to itself even after total penetration by the dies.)

According to the invention, the resulting laminate with the labels 18 cut therein is passed at a station 26 between a pair of rolls 36 and 38 whose rotary motion is maintained exactly in register with the rolls 30 and 32 by means of a gear drive linkage (not shown) driving the illustrated gears which rotate with and power the illustrated rolls.

The roll 38 is formed as an embossing roll with an embossing die or embossing pattern 40 formed thereon as a multiplicity of raised embossing ridges upstanding from the otherwise smooth surface of the roll 38. The pattern 40 registers with the matrix areas of the passing laminate 10 and embosses from the liner side to mechanically disturb the matrix areas preferentially to the areas of the labels 18. The pattern of disturbance that results is labeled 42 and is viewed through the thickness of the laminate 10 at the right end of FIG. 2 and is viewed directly in FIG. 3, which is a view from the bottom side of the laminate 10. The pattern of preferential disturbance 42 may register exclusively with matrix areas or, as indicated in FIGS. 2 and 3, the pattern may also register with the leading ends of the labels 18.

The operation just described is shown even more schematically in FIG. 6. After the laminate 10 is embossed at the station 26, the matrix 20 is stripped at a stripping station 44 and taken up on a scrap roll 46. The liner 14, with the labels 18 supported thereon, is taken up on a label roll 48.

Figure 7:
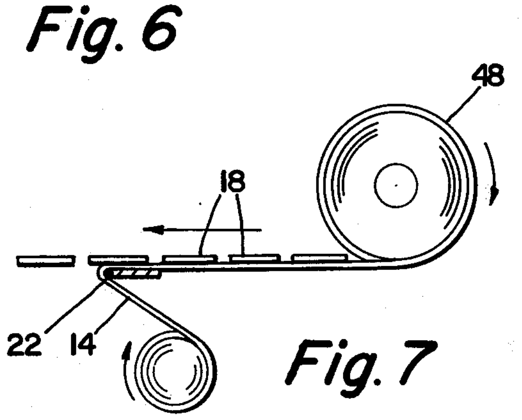
FIG. 7 is a schematic illustration of the separation of labels from a liner which is passed around a peel edge, as during label dispensing.
Figure 3:
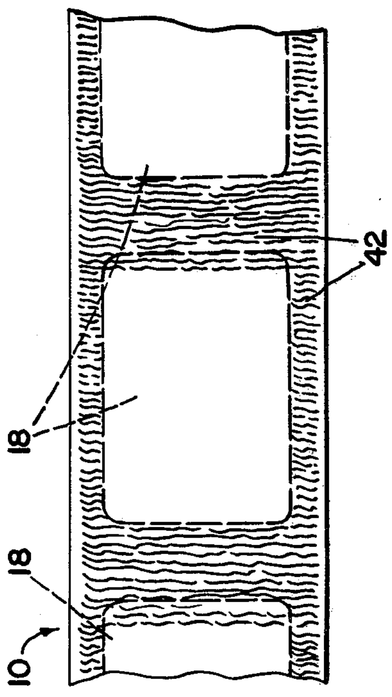
FIG. 3 is a bottom plan view of the web construction seen at the right end of FIG. 2.

As the matrix is lifted from the laminate, as by passing partially upwardly around the roll 45, the separation of the matrix 20 from the remainder of the laminate is positive and certain, due to the prior mechanical disturbing of the laminate at the pattern of disturbance 42 (FIGS. 2 and 3). Subsequently, when the label roll 48 is unwound and the labels 18 are dispensed by passing the liner 14 around a peel edge 22, as illustrated in FIG. 7, the separation of the labels from the liner at the peel edge is positive and certain because the pattern of disturbance 42 includes the leading ends of the labels 18.

Figure 4:
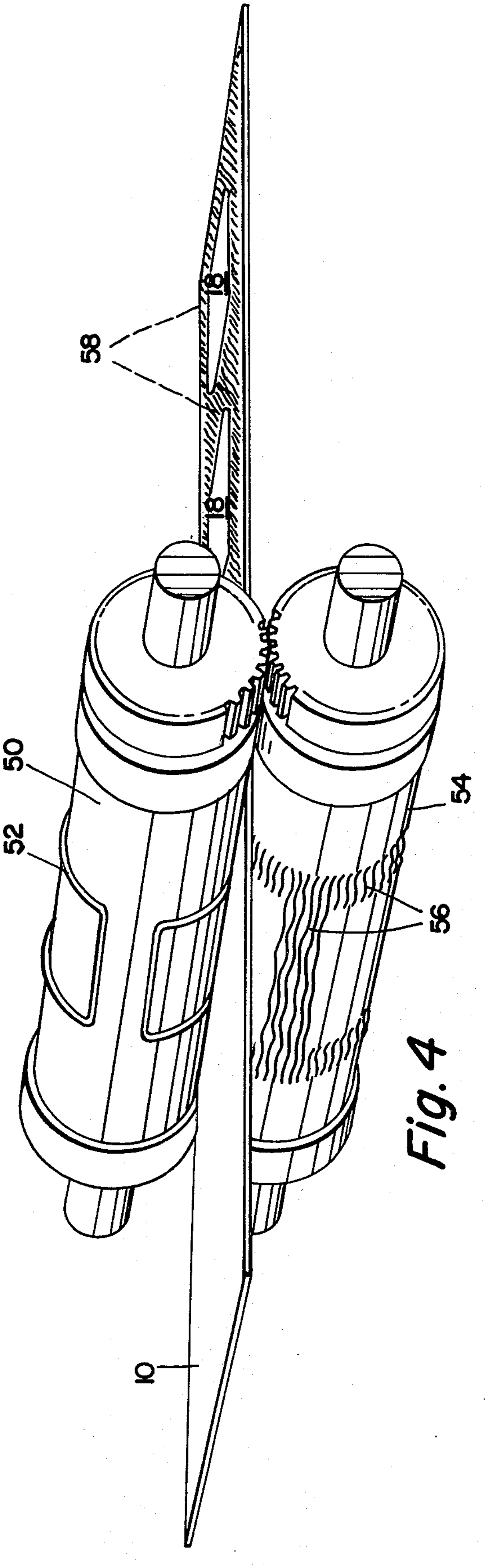
FIG. 4 is a schematic, isometric view of another roll set-up illustrating the invention.

In the embodiment of the invention seen in FIG. 4, die-cutting of the labels 18 and mechanical disturbing of the laminate are accomplished at a single station. The roll 50 is provided with dies 52 and the roll 54 is provided with an embossing die or embossing pattern 56, which creates a pattern of disturbance 58 seen through the thickness of the laminate 10 at the right end of FIG. 4. In this case, the pattern of disturbance does not include the leading ends of the labels 18.

Figure 5:
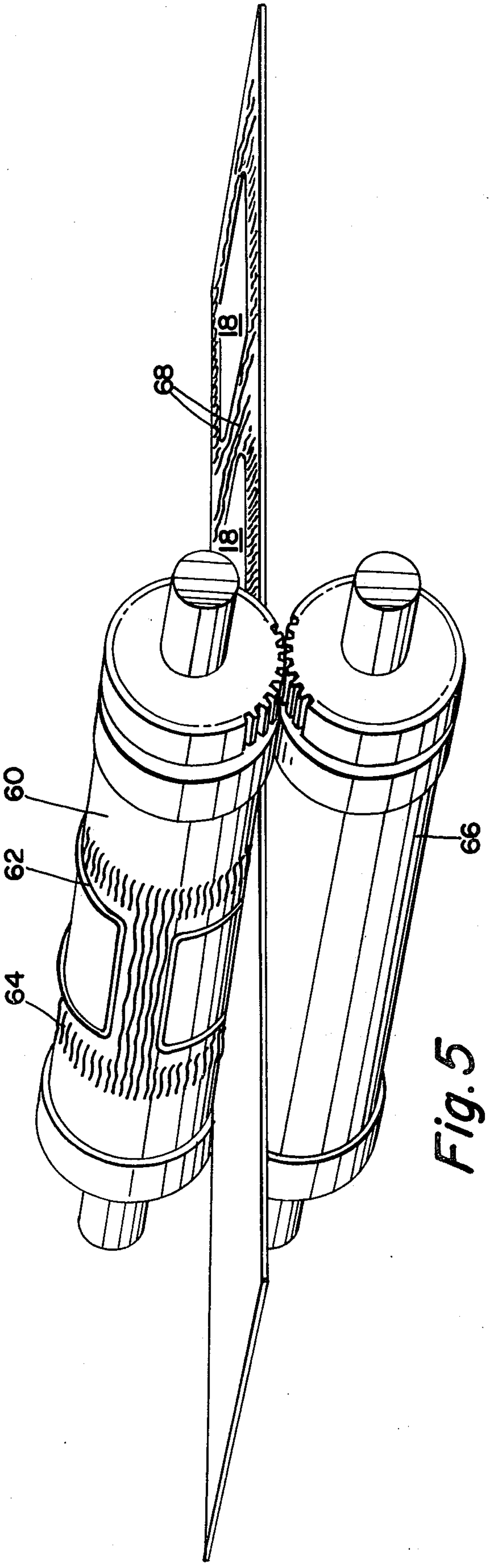
FIG. 5 is a schematic, isometric view of still another roll set-up illustrating the invention.

In another example of the invention, in FIG. 5, the roll 60 is provided both with cutting dies 62 and an embossing die or pattern 64, and the roll 66 is simply an anvil roll. The pattern of disturbance 68 again provides for positive and certain separation of the matrix during stripping. In this instance, the embossing is from the label side of the construction.

The mechanical disturbing accomplished by the embossing may be accomplished or enhanced in other ways. For example, in FIG. 2 the disturbing accomplished by the roll 38 may be enhanced by oscillating the roll slightly lengthwise of its axis as embossing progresses, thus increasing the degree of disturbing that results at the pattern of disturbance 42.

Although the preferential disturbing illustrated is absolute in the sense that there is no disturbing other than at the pattern of disturbance in each of the embodiments illustrated, it is possible to make the preferential disturbing merely relative, thereby providing a pattern of greatest disturbance of a shape similar to the patterns of disturbance 42, 58, or 68, or some similar pattern. Remaining areas might represent patterns of reduced disturbance. This might be accomplished, for example, by embossing the patterns of greatest disturbance to a greater degree than the remaining areas which, however, would be embossed to some degree.

The sequence of die-cutting and embossing may be different from that described above. For example, in FIG. 2, the laminate may be trained from right to left, rather than from left to right, so that the mechanical working at the station 26 occurs before the die-cutting at the station 24 occurs. Of course, in such instance, the labels 18 and the pattern of disturbance 42 would appear at the left end of FIG. 2.

Figure 11:
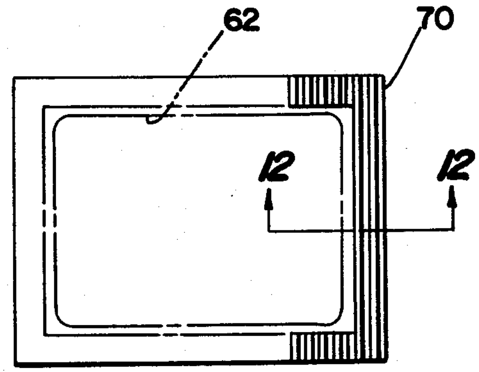
FIG. 11 is a view of an embossing die insert.
Figure 12:
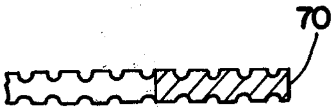
FIG. 12 is an enlarged cross section, taken on the plane of line 12—12 in FIG. 11.
Figure 13:
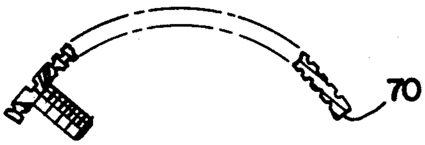
FIG. 13 illustrates how the insert of FIG. 11 may be mounted on a roll.

Although the embossing dies have been described as formed as part of their respective rolls, it may be preferable to form them separately as elements which may then be attached to the rolls. For example, the embossing die 64 in FIG. 5 may be replaced by die inserts such as the die insert 70 illustrated in FIG. 11, which would be butted against similar inserts to provide the complete pattern around an embossing roll. The member 70 would, of course, be positioned in register with the die 62, whose position is indicated in phantom in FIG. 11. The member 70 may be formed as a flat member with a plurality of small grooves and intervening, upstanding ridges, as indicated in FIGS. 11 and 12. The member 70 is then bent or formed to conform to the embossing roll in the manner indicated in FIG. 13, and is fixed to the roll by screws, only one of which is seen in FIG. 13.

Figure 8:
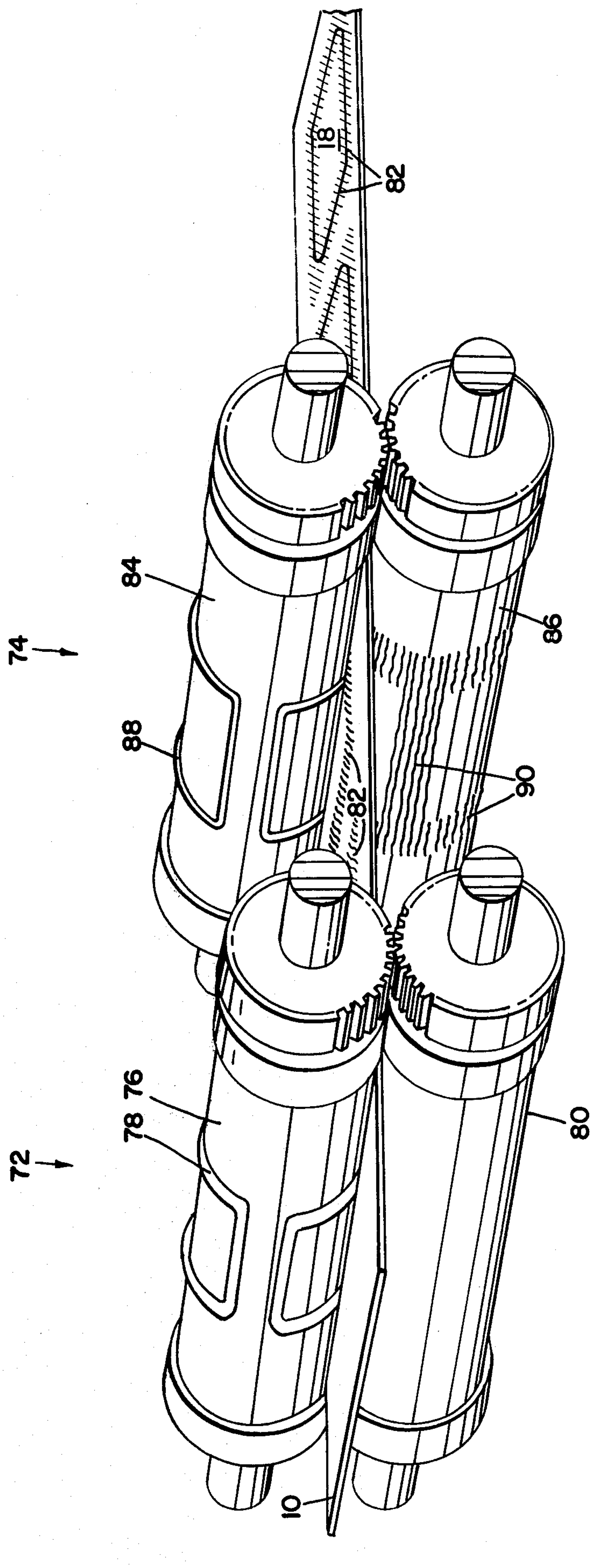
FIG. 8 is a view similar to FIG. 2, illustrating a means of eliminating "halo" effect according to the invention.
Figure 9:
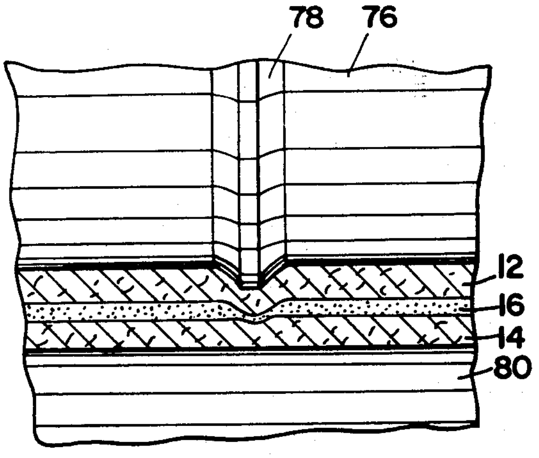
FIG. 9 is a fragmentary, enlarged view, partly in cross section, taken into the nip of the left pair of rolls seen in FIG. 8.
Figure 10:
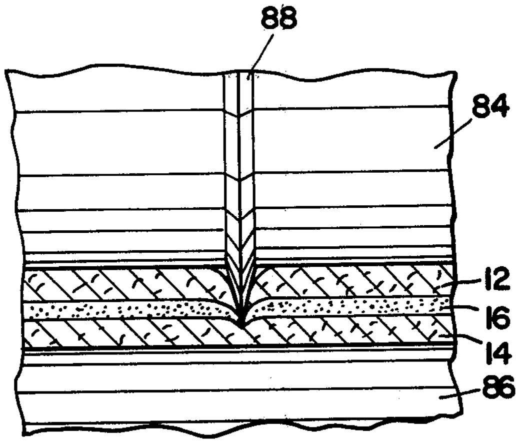
FIG. 10 is a similar view into the nip of the right pair of rolls seen in FIG. 8, with the embossing die or pattern on the lower roll eliminated.

In FIG. 8 another aspect of the invention is illustrated in which the laminate 10 is precrushed in the pattern of the labels to be cut therefrom prior to actual label cutting. The precrushing occurs at the station 72 and die-cutting at the station 74. At the station 72, the roll 76 is provided with crushing dies 78, which squeeze the laminate down against the lower roll 80 to thereby thin the adhesive 16 in the manner indicated in FIG. 9, such thinning occurring along the outline of the edges of the labels which are to be die-cut. In other words, the patterns of the zones of crushing 82 have the same configuration as the labels and register with the cutting dies 88 which are carried on the roll 84 at the station 74. The cutting dies 88 therefore cut into a zone of reduced adhesive, as indicated in FIG. 12. The result is that there is a reduction of the amount of adhesive under the edges of the labels 18, as compared to other areas of the labels. Similarly, there is a reduced amount of adhesive at the edges of the cut-outs in the matrix areas. This reduction in adhesive contributes to ready stripping of the matrix, since there is far less connection (or, more strictly speaking, far less reconnection following die-cutting) between the adhesive under the labels and the adhesive under the matrix areas than had previously been the case. Therefore, the attenuation of the adhesive as described greatly reduces or eliminates any tendency of the adhesive originally under the label edges, particularly the leading edges, to remain with the immediately adjacent adhesive under the corresponding cut edges of the matrix as the matrix starts to be lifted from the labels. The "halo" effect described above is therefore greatly minimized or eliminated.

Precrushing as just described may be employed alone or it may be employed together with preferential disturbance of the matrix areas of the laminate. Thus, in FIG. 8 an embossing die or embossing pattern 90, similar to those previously described, may be omitted, or it may be provided, as shown. For clarity, no resulting pattern of disturbance at the right end of FIG. 8 is shown so as not to obscure the showing of the zone of crushing 82.

While the invention has been illustrated in connection with constructions having an intermediate pressure-sensitive layer, such as the layer 16, the invention can also be useful in some applications where the webs of label and liner material are joined by other means with or without an intervening adhesive layer, as such. For example, the invention may be used where the two webs are releasably bonded together by temperature and pressure. By way of more specific example, the invention may be used in connection with enhancing the peelability of the tags shown in Komendat and Reed U.S. Pat. No. 3,769,147 to common assignee.

The invention is not limited to the precise details described but encompasses variants derived from the concepts disclosed herein.

What is claimed is:

1. In a construction of a series of liner-supported labels comprising a web of liner material and a succession of labels temporarily adhered thereto on a face thereof which is free of permanent association with adhesive, the labels defining, with the liner, label areas which the labels overlie and matrix areas which the labels do not overlie, the improvement wherein liner material at matrix areas of the construction exhibits a greater degree of mechanical disturbance without severance, as by embossment, than does liner material at label areas.

2. A construction as in claim 1 in which no degree of mechanical disturbance is exhibited at label areas.

3. A construction as in claim 2 in which the label areas at which no degree of mechanical disturbance is exhibited do not include areas at leading ends of the labels, and mechanical disturbance is exhibited at the latter areas.

4. A construction as in claim 1, in which some lesser degree of mechanical disturbance is exhibited at label areas.

5. A construction as in claim 4 in which the label areas at which some lesser degree of disturbance is exhibited do not include areas at leading ends of the labels and mechanical disturbance of relatively greater degree is exhibited at the latter areas.

6. In a construction of a series of liner-supported labels comprising a web of liner material and a succession of labels temporarily adhered thereto on a face thereof to constitute label-to-liner laminates, the improvement wherein an area of the laminate at the leading end of each label exhibits a greater degree of mechanical disturbance without severance, as by embossment, than does an area of the construction at the remainder of the extent of each such label.

7. In a construction of a series of liner-supported labels comprising a web of liner material and a series of labels temporarily adhered thereto on a face thereof by means of an adhesive layer between each label and the liner, the improvement wherein the construction exhibits a line of crushing in register with the outline of each label with corresponding thinning out, at the edges of each label, of the adhesive layer associated with each label.

* * * * *